US009921814B2

(12) United States Patent
Copeland et al.

(10) Patent No.: US 9,921,814 B2
(45) Date of Patent: Mar. 20, 2018

(54) CONTROL FLOW GRAPH ANALYSIS

(71) Applicant: INTERNATIONAL BUSINESS MACHINES CORPORATION, Armonk, NY (US)

(72) Inventors: Reid T. Copeland, Markham (CA); Toshihiko Koju, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 14/833,964

(22) Filed: Aug. 24, 2015

(65) Prior Publication Data
US 2017/0060589 A1 Mar. 2, 2017

(51) Int. Cl.
G06F 11/34 (2006.01)
G06F 9/45 (2006.01)

(52) U.S. Cl.
CPC ................. *G06F 8/433* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| 6,018,799 A | 1/2000 | Wallace et al. |
| 6,233,678 B1 * | 5/2001 | Bala ............... G06F 11/3612 712/239 |
| 8,645,910 B2 | 2/2014 | Togawa |
| 8,869,128 B2 | 10/2014 | Koju et al. |

(Continued)

FOREIGN PATENT DOCUMENTS

| JP | 2000-66901 | 3/2000 |
| JP | 2004-227025 | 8/2004 |

(Continued)

OTHER PUBLICATIONS

Ming et al., BinCFP Efficient Multi-threaded Binary Code Control Flow Profiling, 2016.*

(Continued)

*Primary Examiner* — H Sough
*Assistant Examiner* — Zhan Chen
(74) *Attorney, Agent, or Firm* — Tutunjian & Bitetto, P.C.; Vazken Alexanian

(57) ABSTRACT

A method and systems generate a control flow graph including an edge of the control flow graph from a branch instruction to a target address of the branch instruction in an abstract interpretation for an assignment instruction to a branch target variable of a program. The program allocates a particular branch target variable to a branch instruction having a plurality of branch targets. The branch target address is loaded from the branch target variable upon branching, a branch address of a branch instruction having one branch target as well as the address assigned by the assignment instruction to the branch target variable being determined as certain constant values determined by compiling the program. The target address assigned by the assignment instruction is added to an object of the abstract interpretation. A current abstract interpretation is terminated if the abstract interpretation reaches an instruction already subjected to the abstract interpretation.

20 Claims, 11 Drawing Sheets

(56) References Cited

U.S. PATENT DOCUMENTS

| | | | | |
|---|---|---|---|---|
| 2004/0230779 | A1* | 11/2004 | Haghighat | G06F 9/30054 |
| | | | | 712/234 |
| 2005/0223364 | A1* | 10/2005 | Peri | G06F 11/3636 |
| | | | | 717/128 |
| 2005/0257200 | A1* | 11/2005 | Taylor | G06F 17/5054 |
| | | | | 717/136 |
| 2012/0096444 | A1* | 4/2012 | Wright | G06F 8/433 |
| | | | | 717/137 |
| 2013/0086370 | A1* | 4/2013 | Burger | G06F 9/45516 |
| | | | | 712/239 |
| 2014/0157240 | A1* | 6/2014 | Baca | G06F 11/3612 |
| | | | | 717/130 |
| 2014/0258688 | A1* | 9/2014 | Breternitz | G06F 11/3428 |
| | | | | 712/220 |
| 2015/0007142 | A1* | 1/2015 | Biffle | G06F 21/53 |
| | | | | 717/126 |

FOREIGN PATENT DOCUMENTS

| | | |
|---|---|---|
| JP | 2009-205586 | 9/2009 |
| JP | 2013-156971 | 8/2013 |

OTHER PUBLICATIONS

Bahmann et al., Perfect Reconstructability of Control Flow from Demand Dependence Graphs, 2014.*

Kinder, et al. "An Abstract Interpretation-Based Framework for Control Flow Reconstruction from Binaries", Verification, Model Checking, and Abstract Interpretation, 10th International Conference (VMCAI) Atlanta, GA., pp. 1-21, Jan. 2009.

* cited by examiner

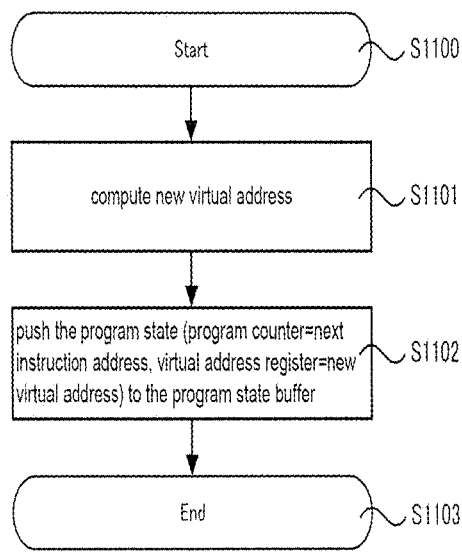
Fig.11 flowchart (b)
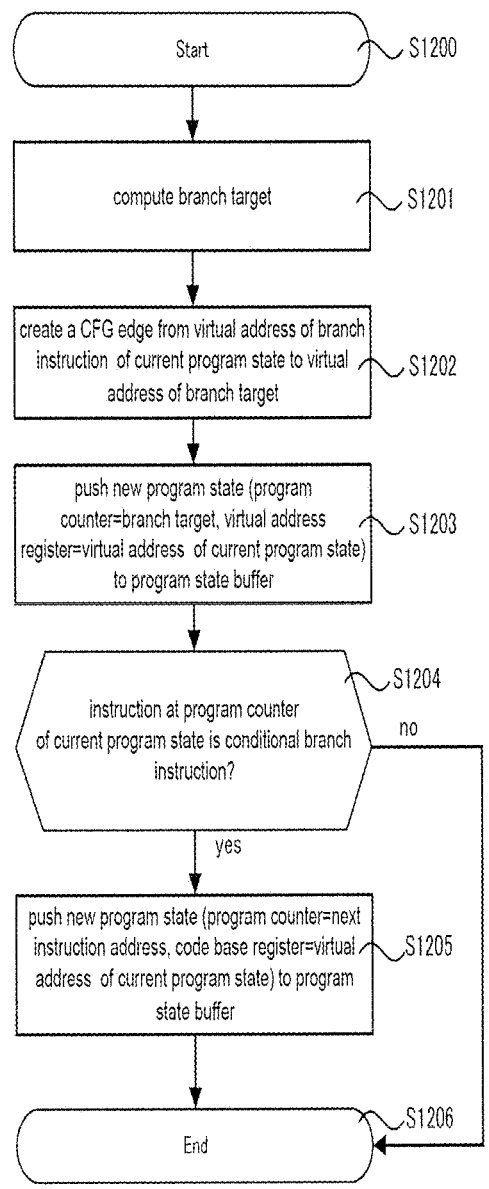
Fig.12 flowchart (c)

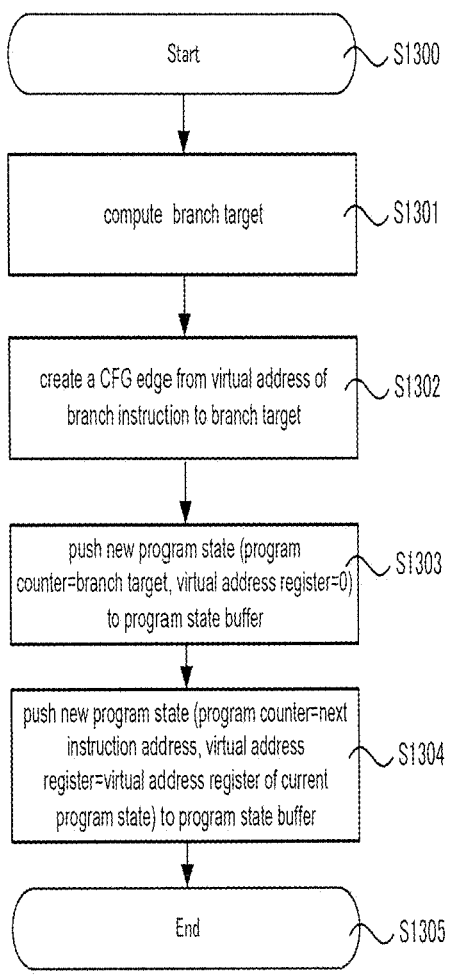
Fig. 13 flowchart (d)
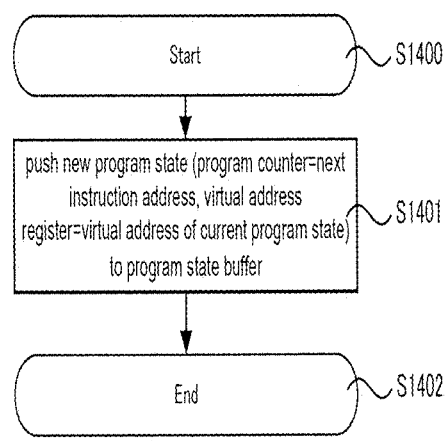
Fig. 14 flowchart (e)
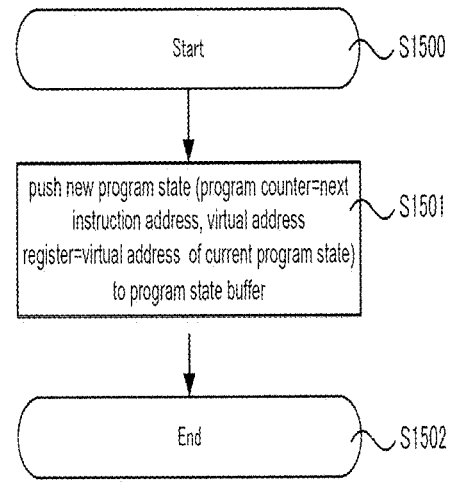
Fig. 15 flowchart (f)

Fig. 16

| COBOL binary (size) | traditional abstract interpretation | | our invention | |
|---|---|---|---|---|
| | CPU time | memory | CPU time | memory |
| Sample 1 (233KB) | 712 sec (cannot finish due to out-of-memory error) | out-of-memory (1.25GB) | 0.027 sec | 5.1MB |
| Sample 2 (41KB) | 3198 sec (cannot finish due to out-of-memory error) | out-of-memory (1.25GB) | 0.004 sec | 744KB |

(a)

| | Number of CFG edges | | | |
|---|---|---|---|---|
| COBOL binary | Sample 3 | Sample 4 | Sample 5 | Sample 6 |
| traditional abstract interpretation | 57 | 125 | 95 | 140 |
| our invention | 56 | 141 | 99 | 139 |

(b)

CONTROL FLOW GRAPH ANALYSIS

BACKGROUND

The present invention relates to analysis algorithms for a control-flow graph and more particularly relates to an algorithm for a control flow graph generation with improved efficiency.

To improve computing performance of software, particularly the software run as an object code compiled from a source code, a precise analysis of a control-flow graph has been yet expected.

SUMMARY

According to an embodiment of the present invention, a computer executable method for analyzing a control flow graph by an abstract interpretation of a program may be provided. The computer executable method may comprise:

generating an edge of a control flow graph from a branch instruction to a target address of the branch instruction in an abstract interpretation for an assignment instruction to a branch target variable of a program, the program allocating a particular branch target variable to each of a branch instruction having a plurality of branch targets, the branch target address being loaded from the branch target variable upon branching, a branch address of a branch instruction having one branch target as well as the address assigned by the assignment instruction to the branch target variable being determined as certain constant values determined by compiling the program;

adding the target address assigned by the assignment instruction to an object of the abstract interpretation; and terminating a current abstract interpretation in the case that the abstract interpretation reaches to an instruction already subjected to the abstract interpretation.

According to an embodiment of the present invention, a computer system for analyzing a control flow graph by an abstract interpretation of a program may be provided. The computer system may comprise a memory and a processor for executing a computer program tangibly loaded in the memory and the computer system may comprise the program codes of:

generating an edge of a control flow graph from a branch instruction to a target address of the branch instruction in an abstract interpretation for an assignment instruction to a branch target variable of a program, the program allocating a particular branch target variable to each of a branch instruction having a plurality of branch targets, the branch target address being loaded from the branch target variable upon branching, a branch address of a branch instruction having one branch target as well as the address assigned by the assignment instruction to the branch target variable being determined as certain constant values determined by compiling the program;

adding the target address assigned by the assignment instruction to an object of the abstract interpretation; and terminating a current abstract interpretation in the case that the abstract interpretation reaches to an instruction already subjected to the abstract interpretation.

According to an embodiment of the present invention, a control flow graph analyzer for generating a control flow graph to optimize binary object codes of a program in COBOL may be provided. The control flow graph analyzer may comprise:

generating an edge of a control flow graph from a branch instruction to a target address of the branch instruction in an abstract interpretation for an assignment instruction to a branch target variable of a program, the program allocating a particular branch target variable to each of a branch instruction having a plurality of branch targets, the branch target address being loaded from the branch target variable upon branching, a branch address of a branch instruction having one branch target as well as the address assigned by the assignment instruction to the branch target variable being determined as certain constant values determined by compiling the program;

adding the target address assigned by the assignment instruction to an object of the abstract interpretation; and terminating a current abstract interpretation in the case that the abstract interpretation reaches to an instruction already subjected to the abstract interpretation.

According to an embodiment of the present invention, a program product for making a computer system execute an analysis of a control flow graph, the program product comprising a computer readable media recorded therein a program for analyzing the control flow graph and being tangibly stored in a memory of the computer system may be provided. The program may comprise the program codes of:

generating an edge of a control flow graph from a branch instruction to a target address of the branch instruction in an abstract interpretation for an assignment instruction to a branch target variable of a program, the program allocating a particular branch target variable to each of a branch instruction having a plurality of branch targets, the branch target address being loaded from the branch target variable upon branching, a branch address of a branch instruction having one branch target as well as the address assigned by the assignment instruction to the branch target variable being determined as certain constant values determined by compiling the program;

adding the target address assigned by the assignment instruction to an object of the abstract interpretation; and terminating a current abstract interpretation in the case that the abstract interpretation reaches to an instruction already subjected to the abstract interpretation.

BRIEF DESCRIPTION OF DRAWINGS

FIG. 11 shows the sub-process (b) of the flowchart (b).

FIG. 12 shows the sub-process (c) of the flowchart (c).

FIG. 13 shows the process of the sub-process (d) of the flowchart (d).

FIG. 14 shows the sub-process (e) identified by the flowchart (e).

FIG. 15 shows the sub-process (f) identified by the flowchart (f).

FIG. 16 shows an experimental examination of the present embodiment for improving computing performances of CFG.

DETAILED DESCRIPTION

Figure 1:
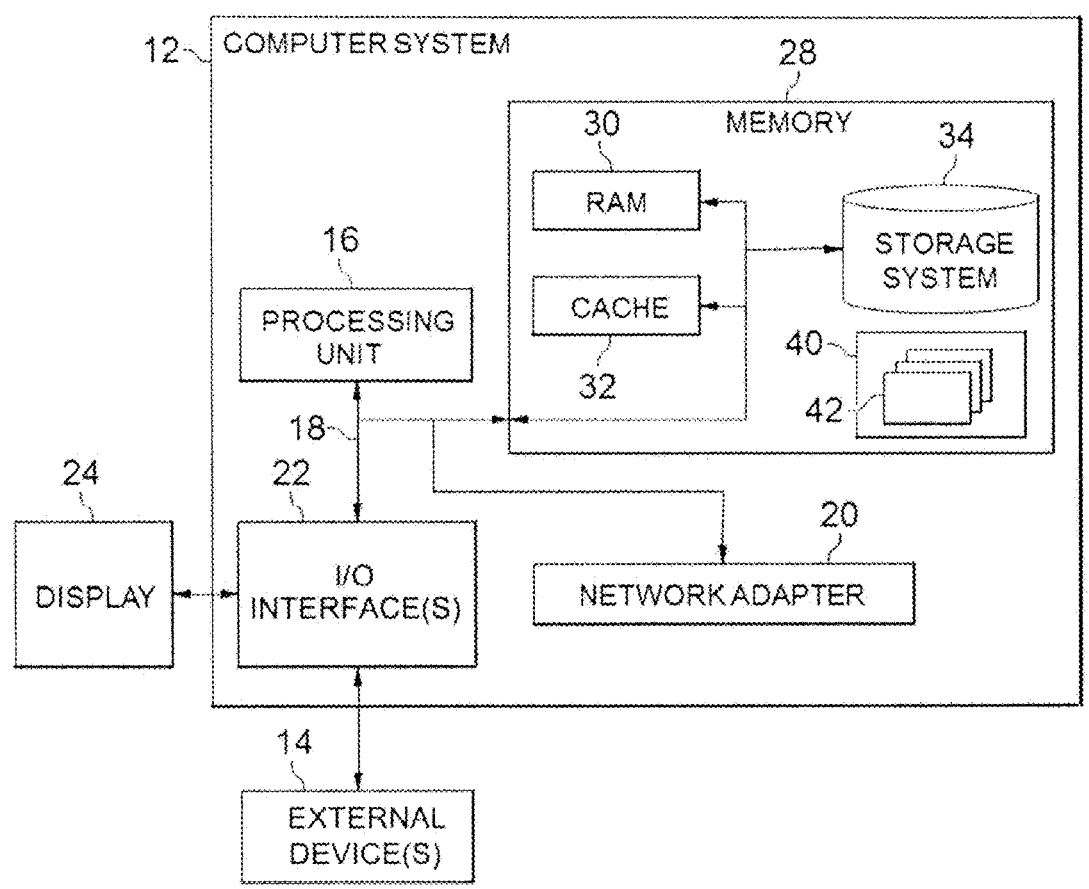
FIG. 1 shows a computer system of one embodiment.

Now, the present invention will be described using particular embodiments associated by drawings; however, the described embodiments should not limit the present invention. FIG. 1 shows a computer system of one embodiment. Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system 12 in cloud computing node 10 is shown in the form of a general-purpose computing device. The components of computer system may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system includes a variety of computer system readable media. Such media may be any available media that is accessible by computer system 12, and it includes both volatile and non-volatile media, removable and non-removable media.

The system memory 28 can include computer system readable media in the form of volatile memory, such as random access memory (RAM) 30 and/or cache memory 32. Computer system may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

The computer system 12 may also communicate with one or more external devices 14 such as a keyboard, a pointing device, a display 24, etc.; one or more devices that enable a user to interact with computer system; and/or any devices (e.g., network card, modem, etc.) that enable computer system to communicate with one or more other computing devices. Such communication can occur via Input/Output (I/O) interfaces 22. Still yet, computer system can communicate with one or more networks such as a local area network (LAN), a general wide area network (WAN), and/or a public network (e.g., the Internet) via network adapter 20. As depicted, network adapter 20 communicates with the other components of computer system via bus 18. It should be understood that although not shown, other hardware and/or software components could be used in conjunction with computer system. Examples, include, but are not limited to: microcode, device drivers, redundant processing units, external disk drive arrays, RAID systems, tape drives, and data archival storage systems, etc.

The computer system 12 may be implemented as a server computer operated by appropriate operating systems and/or a main frame computer such as Z Architecture (Trademark) operated under Z/OS; but not limited thereto, other any embodiment may be allowed.

Figure 2:
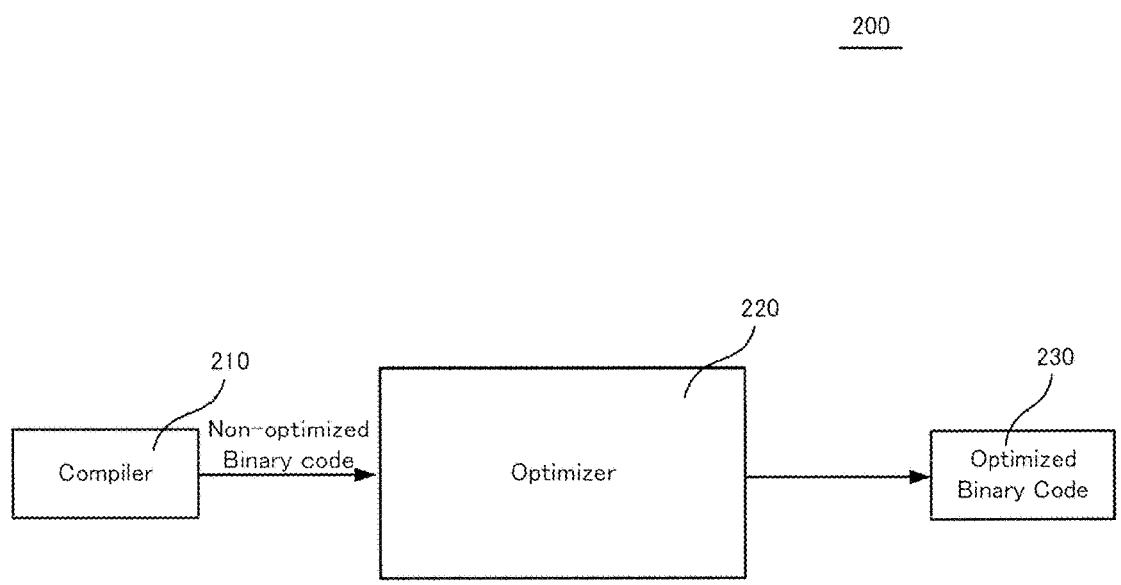
FIG. 2 shows a functional construction 200 implemented in the computer system 12 according to an embodiment.

FIG. 2 shows a functional construction 200 of one embodiment implemented in the computer system 12. The functional construction 200 may comprise a compiler 210 and an optimizer 220 and the optimizer outputs optimized binary codes 230. The compiler 210 compiles a source code described in high level programming languages such as PL-I, COBOL, FORTRAN, C, and/or C++ to generate binary object codes. The binary codes to which the present embodiment will be applied are those having following properties and are not limited to particular language types of source codes:

(1) Each branch instruction which has multiple branch targets is associated with a single variable (hereafter referred to simply variable) for designating the branch target address. (2) A branch instruction which has multiple branch targets loads its branch targets from this variable. (3) This variable is initialized with the instruction address which is next to the associated branch instruction. (4) Each instruction which stores a branch target address to a branch-target-variable stores a constant address.

The binary object codes from the compiler 210 may not be always optimized and sometimes 90% or more binary object codes may be not optimized yet just after compiling. Since non-optimized binary object codes degrade computing performances, the non-optimized binary codes are optimized by the optimizer 220.

The optimizer 220 receives the non-optimized binary object codes and optimizes the non-optimized binary codes by using a control flow graph and then outputs the optimized binary codes 230 used by the computer system 12. Now, the detail of the control flow graph will be explained as well as other functions of the optimizer 220.

Figure 3:
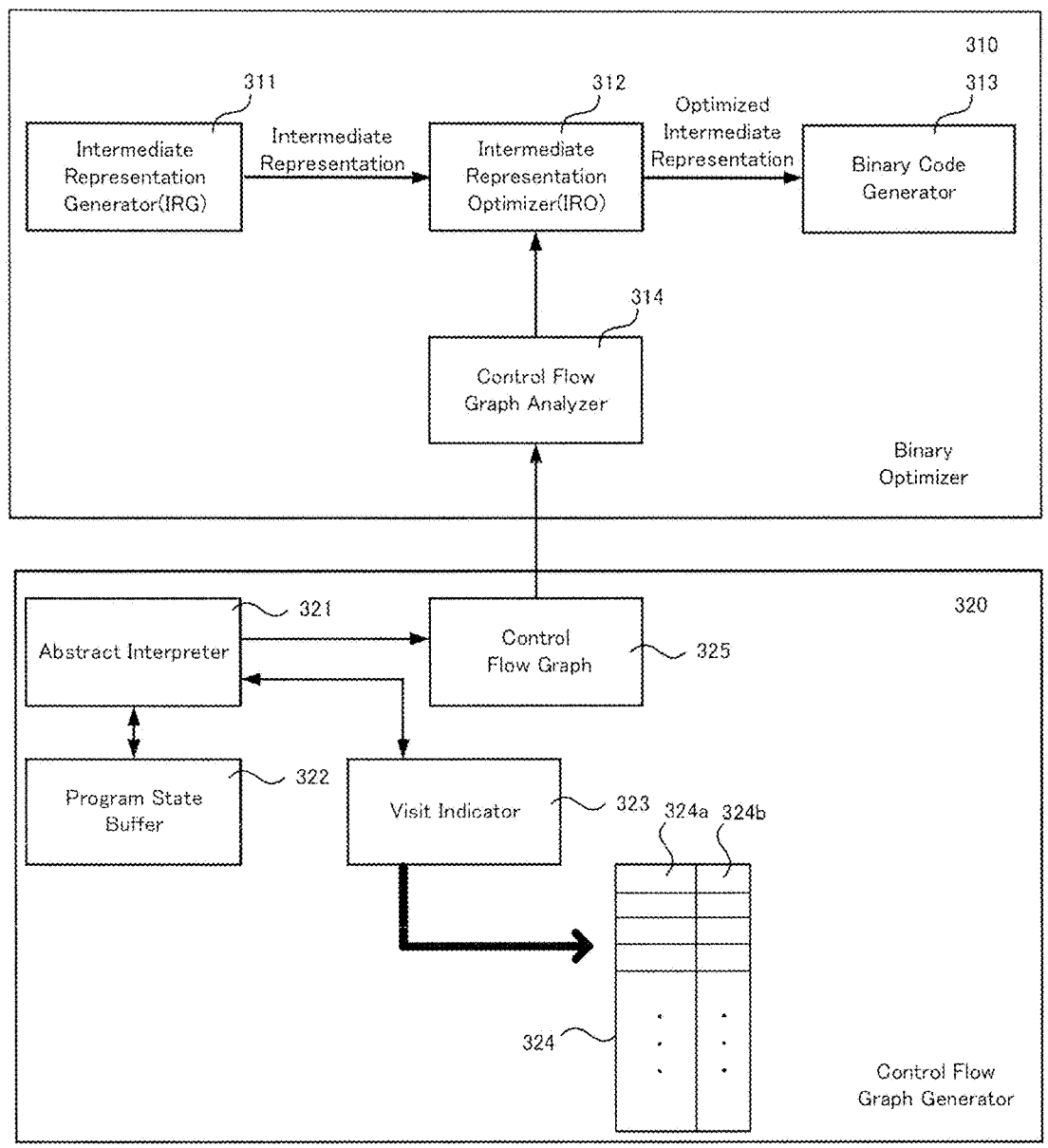
FIG. 3 shows a detailed functional construction 300 of the optimizer 220.

FIG. 3 shows a detailed functional construction 300 of the optimizer 220. The optimizer 220 may comprise a binary optimizer 310 and a control flow graph generator 320. The binary optimizer 310 comprises an intermediate representation generator (IRG) 311, an intermediate representation optimizer (IRO) 312, and a binary code generator 313. The IRG 311 receives the non-optimized binary object codes and generates an intermediate representation of the binary object codes in an appropriate form available by the computer system 12. The generated intermediate representation is input to the IRO 312 to optimize the intermediate representation using a control flow graph from a control flow graph analyzer 314.

An optimized intermediate representation is input to the binary code generator 313. The binary code generator 313 generates optimized binary codes from the optimized intermediate representation to output the optimized binary codes. The optimized binary codes may be stored in the system memory 28 for providing program functions by execution of the processor 16.

The binary optimizer 310 per se is not a point of the present invention and further detailed description will be omitted. More detailed description can be referred to U.S. Pat. No. 8,869,128B2. The optimizer 220 in the embodiment of FIG. 2 further comprises a control flow graph generator 320. The control flow graph generator 320 generates a control flow graph 325 which is provided to the optimization of the binary optimizer 310.

The control flow graph generator 320 comprises an abstract interpreter 321 and a program state buffer 322. The abstract interpreter 321 simulates the program abstractly by computing program states based on binary object codes (non-optimized). The program state buffer 322 stores instruction information used by the abstract interpreter 321 which may include at least program counter and a virtual address so as to support the abstract interpretation according to one embodiment. The program state buffer 322 may be constructed as a memory structure such as FILO with respect to the instruction information.

The control flow graph generator 320 further comprises a visit indicator 323. The visit indicator 323 indicates whether or not the abstract interpreter 321 has already visited to the program counter stored in the program state buffer 322. As one embodiment, the visit indicator 323 may comprises a visit table 324 including a column 324a including copies of the program counter and a mating column 324b for recording visit flags to the corresponding program counter.

Other any implementation may be contemplated so far as the similar function with the visit table 324 of FIG. 3 may be obtained and other equivalent constructions may be adopted depending on particular implementation requirements. According to an embodiment, the abstract interpreter 321 terminates a current abstract interpretation without conducting redundant abstract interpretations such that an efficiency of the abstract interpretation may be improved.

The control graph generator 320 generates a control flow graph 325 as the results of the abstract interpretation of the abstract interpreter 321. The control flow graph 325 is used by the binary optimizer 310 for generating optimized intermediate representation. The optimized intermediate representation is then used by the binary code generator 313 to output the optimized binary codes.

Figure 4:
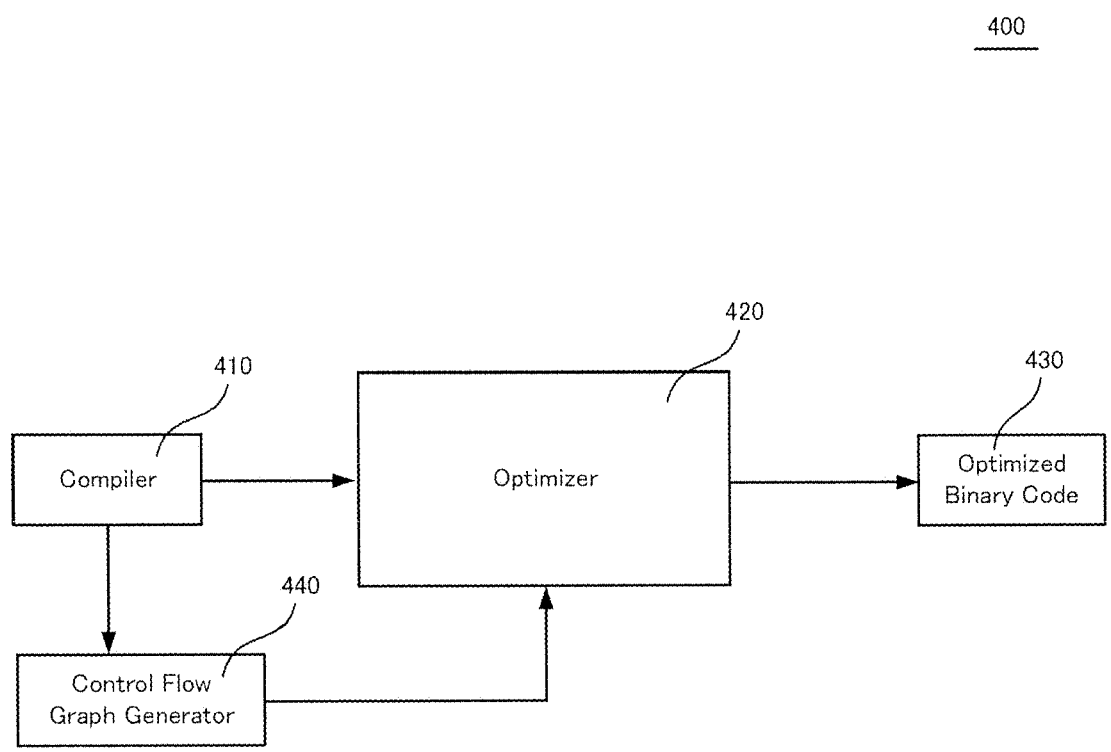
FIG. 4 shows an alternative embodiment 400 of the control flow graph generator 440.

FIG. 4 shows an alternative embodiment 400 of the control flow graph generator 440. In the embodiment of FIG. 4, the control flow graph generator 440 is implemented as a module separate from a compiler 410 or the optimizer 420 rather than a module of the optimizer 420. The embodiment may be effective as a tool for reverse engineering of the binary codes and/or an instrumentation tool for inserting some watching codes to the binary object codes. The control flow graph generator 440 generates the control flow graph as the procedure explained in the embodiment shown in FIG. 3 by using the binary object codes and generates the control flow graph. The control flow graph is then referenced by the optimizer 420 when the binary object code is optimized as well as other optional functions. The embodiment of FIG. 4 may be also effective when the compiler 410 and the optimizer 420 are separately implemented to the computer system.

Figure 5:
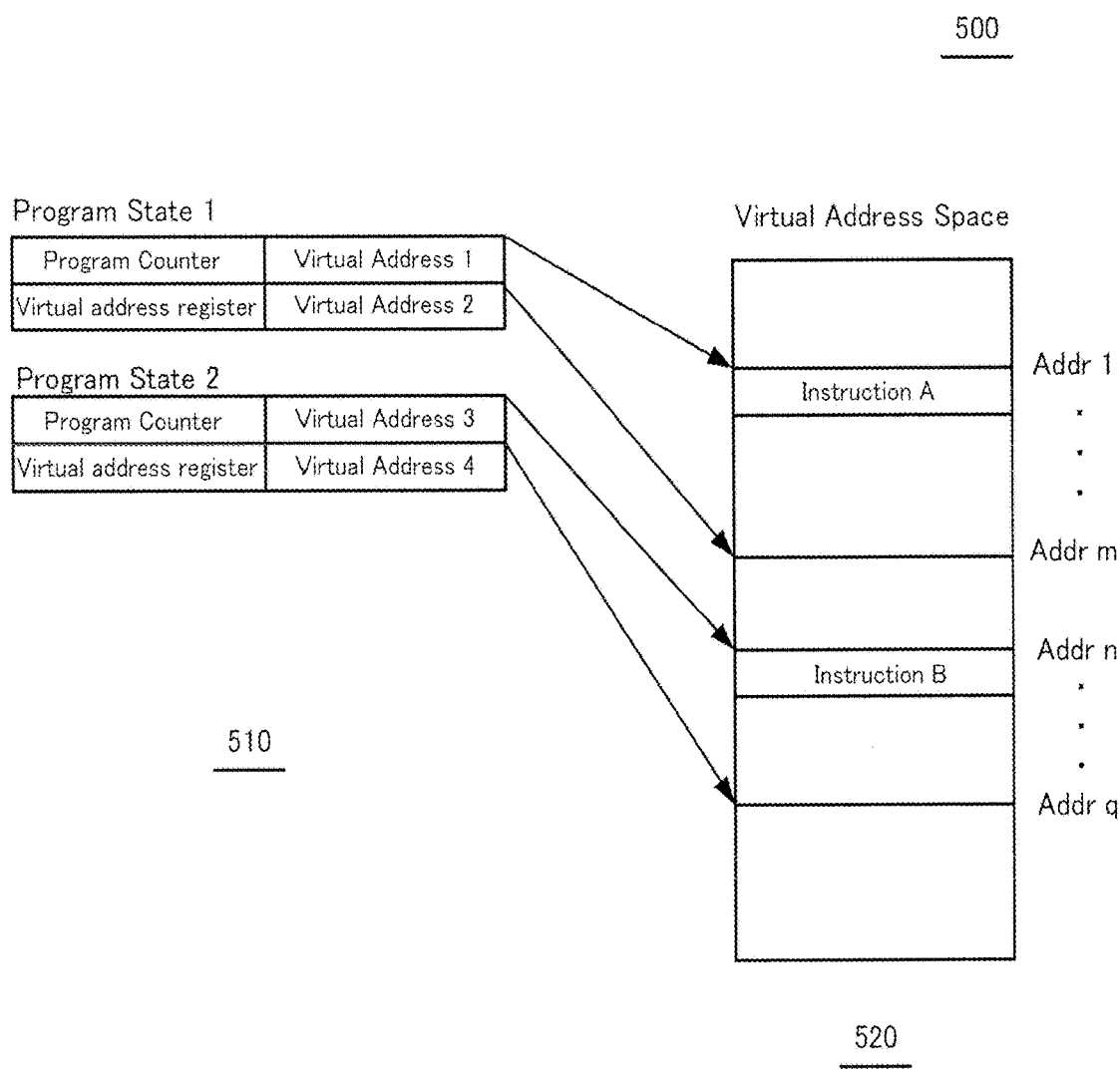
FIG. 5 shows an embodiment 500 illustrating the relation of the program counter 510, a virtual address 520, and the binary object code.

FIG. 5 shows an embodiment 500 illustrating the relation of the program counter states and a virtual address space 520. The program counter program states are defined by a pair of values of program counter and value of virtual address register each associated with respective virtual addresses. The values of the program counter are mapped to the virtual address of the binary code of the instruction A as well as the instruction B in the virtual address space to make it to possible to execute the instructions along with the program.

The virtual address register stores a first virtual address of a segment of the binary object code to be executed by the processor 16 and the values of the virtual address registers are also mapped to corresponding virtual addresses of the binary object codes. The binary object codes are segmented in the virtual address space 520 and therefore, the program state of the present embodiment may be defined by the pair of the program counter and the virtual address register.

A particular architecture using such implementation may include, but not limited to, Z/Architecture (Trademark) or System Z (Trademark) and the embodiment shown in FIG. 5 may be applicable to any computer system which virtualizes the instruction codes.

The first virtual address of a segment of the binary object code in the virtual address space 520 may be referred in one embodiment to the term "code base address" and "code base address" may be particularly referred to PBL in an embodiment of COBOL.

Here, the operation of the virtual address will be described. When the program is run, the virtual address Addr 1 is loaded in a virtual address register. Loading of the virtual address may be determined depending on the program and a loaded instruction is not placed just prior to loading of the virtual address. For the branch instructions, the branch addresses are values determined when the program is compiled; if the branch instruction has only one branch target, the branch address is calculated by adding an immediate operand of the branch instruction determined upon compiling to the virtual address currently stored in the virtual address register; if the branch instruction has multiple branch target, another variable is allocated for storing the target addresses. The target addresses are calculated by adding immediate operands of an assignment instruction determined upon compiling to the virtual address currently stored in the virtual address register and the result is stored in a register prepared for the above another variable.

In such instruction structure, the abstract interpretation of the program codes is necessary, because the instruction which loads the virtual address to the code base register may locate far apart from the branch instruction and the branch addresses cannot be analyzed without actual abstract interpretations along with the progresses of the computation.

Figure 7:
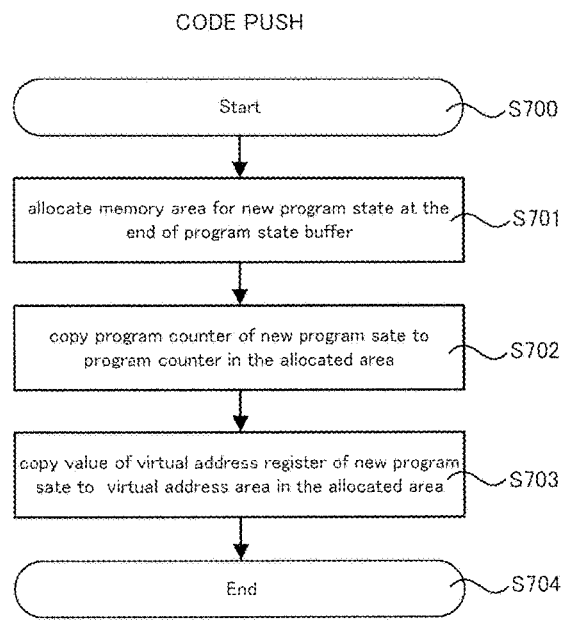
FIG. 7 shows the function of the code "PUSH" and the data structure of the program state buffer.

Now, a process for generating the control flow graph will be described using particular embodiment for COBOL. The main process starts the processing thereof from the step S600 and loads the initial state of the program in the program state buffer. The function of the code "PUSH" and the data structure of the program state buffer are shown in FIG. 7. The code "PUSH" is described by a system language and starts the processing thereof from the step S700 and allocates a memory area for new program state at the end of the program state buffer in the step S701. Then the code "PUSH" copies a program counter of a new program state to a memory area allocated for the program counter in the program state buffer in the step S702.

In the step S703 the code "PUSH" copies the value of the virtual address register, which stores the virtual addresses Addr 1, . . . , Addr q in FIG. 5 corresponding to the first virtual addresses of the split and regimented binary object code, to a virtual address area in the program state buffer corresponding to the program counter of the new state and then the process of the code "PUSH" is end and returns the control to the main process.

Figure 8:
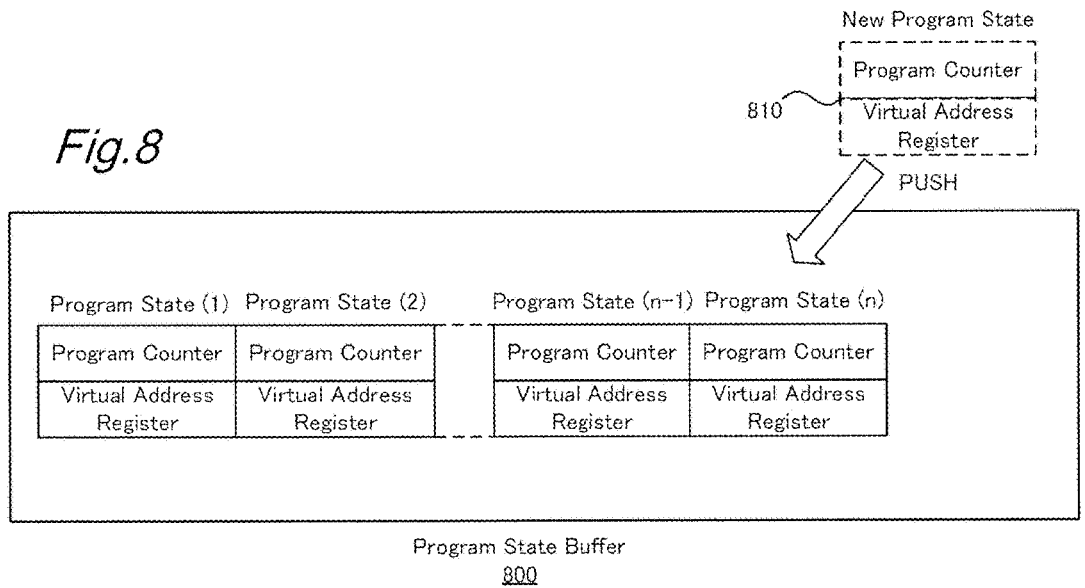
FIG. 8 shows an example embodiment of the data structure 800 of the program state buffer 322.

FIG. 8 shows an example embodiment of the data structure 800 of the program state buffer 322. The program state buffer 322 stores the program state or program states invoked in the abstract interpretation and not completed yet. When the abstract interpretation advances to the new program state, which is characterized by a pair 810 including the program counter and the value of the virtual address register, is added to the program state buffer 322 to generate the data structure 800.

Figure 9:
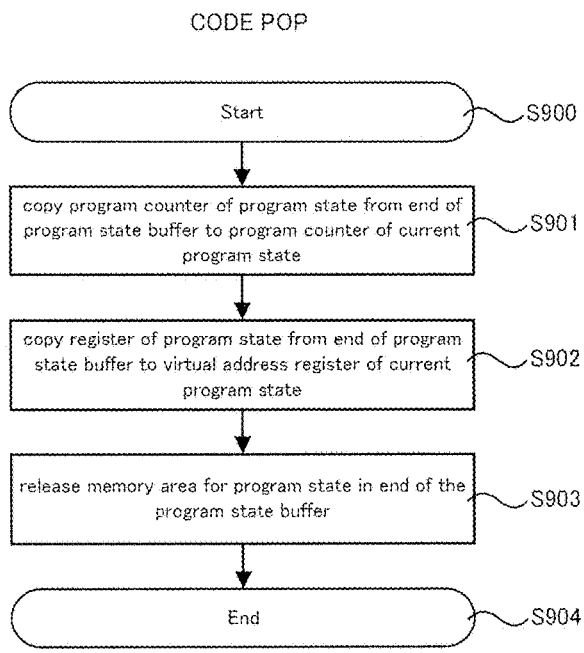
FIG. 9 shows the detailed function of the code "POP".

Now, again referring to FIG. 6, the main process for generating the control flow graph will be described. In the step S602, the main process determines whether or not the program state buffer is empty. If the program state buffer is empty (yes), all of the program instructions to be subjected to the abstract interpretation has been completed and the process goes to the step S603 to end. If the determination in the step S602 returns negative result (no), the main process invokes the code "POP" and applies to the current program state in the program state buffer in the step S604. FIG. 9 shows the detailed function of the code "POP".

The code "POP" starts from the step S900 and in the step S901 for the purpose of the abstract interpretation, copies the program counter of the current program state from the end of the program state buffer. Then in the step S902 the code "POP" copies the value of the virtual address register for the program state from the end of the program state buffer. In the step S903 the code "POP" deletes the corresponding data from the program state buffer and releases the memory area therefor and stops the processing thereof in the step S904 to return the control to the main process.

Figure 10:
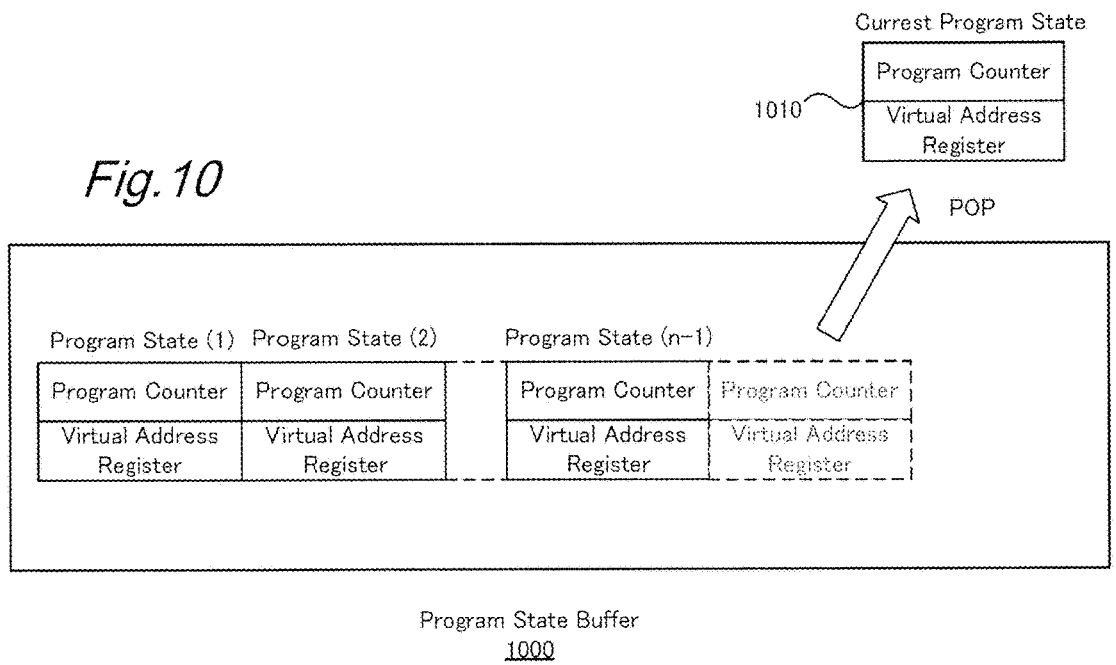
FIG. 10 shows a function of the code "POP" using the data structure 1000.

FIG. 10 shows a function of the code "POP" using the data structure 1000. When the abstract interpreter 321 starts the processing thereof, the abstract interpreter 321 copies the contents corresponding to the program state to be subjected to the next abstract interpretation from the program state buffer and remove the copied entry to indicate the completion of the abstract interpretation as well as the generation of the control flow graph. The contents in the program state buffer 322 will be empty when the all of the program states to be subjected to the abstract interpretation has been copied.

Again referring to FIG. 6, the main process examines in the step S605 whether or not a visit flag is set to the corresponding the program counter of the program state in the visit indicator 323. If the visit flag has been already set to the program counter of the current program state (yes), since the program state has already been subjected to the abstract interpretation, the process returns to the step S602 to examine if the program state buffer is empty to avoid redundant interpretation of the instructions.

If the visit flag is not set yet (no), in the step S606 the process determines whether or not the instruction at the program counter of the current program state is an instruction requiring an update of the virtual address register. If so (yes), the main process invokes the sub-process (b) identified by the flowchart (b) of FIG. 11 in the step S612.

Now, the sub-process of the flowchart (b) will be explained using FIG. 11. In FIG. 11, The sub-process (b) process starts from S1100 and in the step S1101, the sub-process computes a new virtual address for the current program state and then invokes the code "PUSH" to add the information of the program state to the program state buffer and then the sub-process (b) passes the control to the main process in the step S1103 to end. This sub-process corresponds to the practical process of the addition of new entry to the program state buffer 322 shown in FIG. 8.

If the instruction of the current program state in the program counter is not an instruction requiring an update of the virtual address register (no) in the step S606, the process in the step S607 determines whether or not the instruction at the program counter of the current program state is a branch instruction which has single branch target. If so (yes), the process invokes the sub-process (c) identified by the flowchart (c) in the step S613.

Here, the sub-process (c) of the flowchart (c) will be described using FIG. 12. The sub-process (c) of FIG. 12 starts from the step S1200 and in the step S1201, the target virtual address is computed as described above. In the step S1202 the sub-process creates an edge of the control flow graph (hereafter referred to CFG) from the virtual address associated with the program counter of the current program state to a virtual address of the branch target. Then the sub-process in the step S1203 invokes the code "PUSH" to add new program state (program counter=branch target, virtual address register=virtual address register of the current program state) to the program state buffer 322.

Then, the sub-process determines whether or not the instruction at the program counter of the current program state is a conditional branch instruction. If so (yes), the sub-process invokes the code "PUSH" new program state (program counter=next instruction address, virtual address register=virtual address of the current program state) to the program state buffer and goes to the step S1206 to end. If the program counter in the current program state is not the conditional branch instruction (no), the sub-process jumps to the step S1206 and passes the control to the main process to end.

Figure 6:
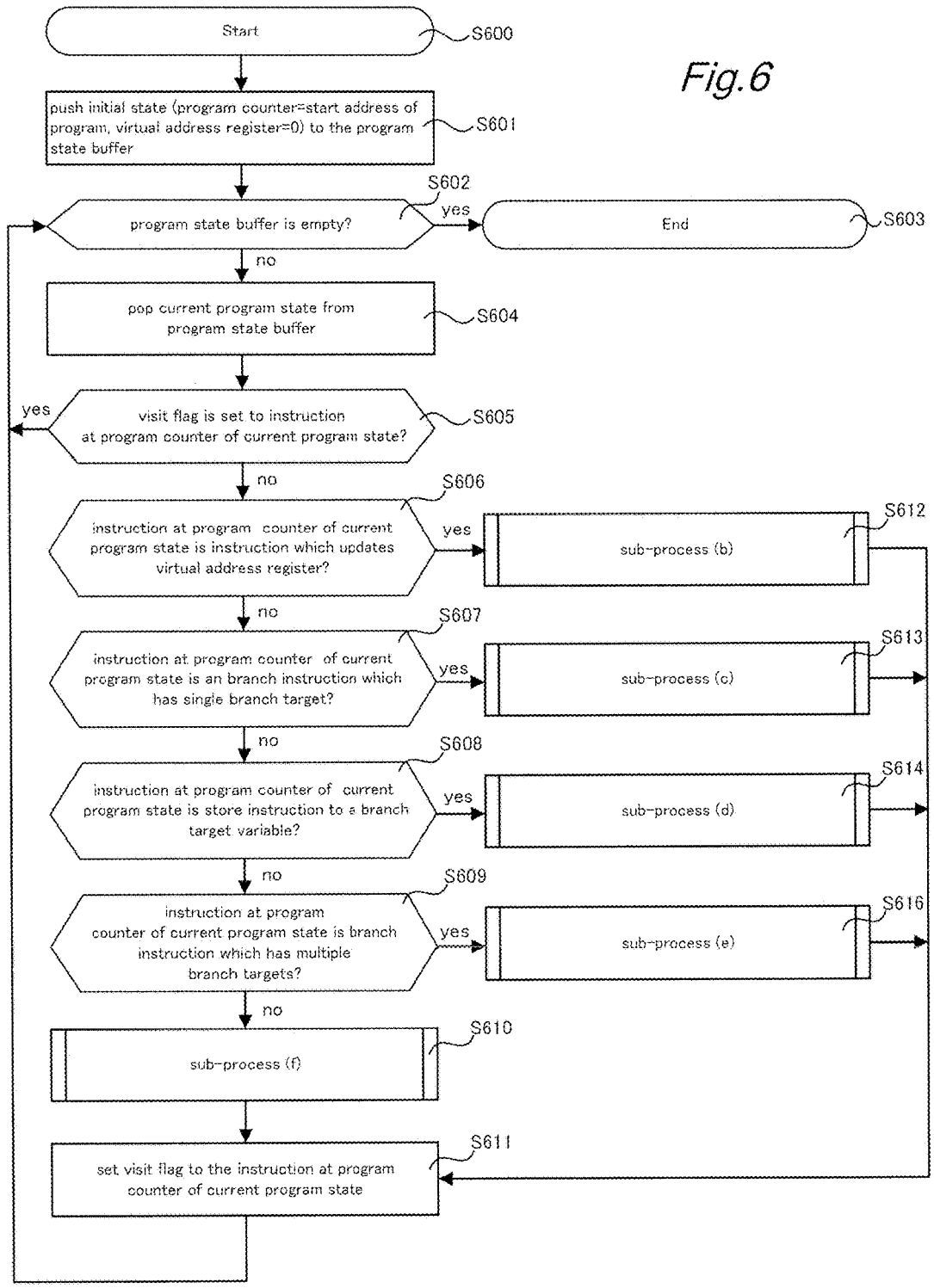
FIG. 6 shows a process for generating the control flow graph using a particular embodiment for COBOL.

Here, referring to FIG. 6, the process for generating CFG will be continued. When the determination of the step S607 returns negative results (no), the process next in the step S608 determines whether or not the instruction at the program counter of the current program state is a store instruction to a branch target variable. If so (yes), the process invokes the sub-process identified by the flowchart (d) in the step S614.

FIG. 13 shows the process of the sub-process (d) of the flowchart (d). The sub-process (d) starts from the step S1300 and in the step S1301 computes the branch target. Then, the sub-process creates a CFG edge from the virtual address associated with the branch instruction to a virtual address of the branch target. Subsequently, the sub-process invokes the code "PUSH" a new program state (program counter=branch target, virtual address register=0) to the program state buffer in the step S1303. Further then the sub-process (d) invokes the code "PUSH" to add new program state (program counter=next instruction address, virtual address register=virtual address of the current program state) to the program state buffer 322 in the step S1304 so that the next instruction of the store instruction to a branch target variable is subjected to the abstract interpretation. The sub-process further and the sub-process (d) passes the control to the main process in the step S1305 to end.

If the determination in the step S608 returns the negative result (no), the process further determines whether or not the instruction at the program counter of current program state is a branch instruction which has multiple branch targets. If so (yes), the process invokes the sub-process (e) identified by the flowchart (e) in the step S615. If the determination of the step S609 returns the negative result (no), the process invokes the sub-process identified by the flowchart (f) in the step S610. Now, the sub-process (e) of the flowchart (e) will be first explained.

FIG. 14 shows the sub-process (e) identified by the flowchart (e). The process starts from the step S1400 and invokes the code "PUSH" in the step S1401 to add new program state (program counter=next instruction address, virtual address register=virtual address of current program state) to the program state buffer 322. Then the sub-process passes the control to the main process in the step S1402 to end.

FIG. 15 shows the sub-process (f) identified by the flowchart (f). This sub-process handles other instructions than described above and starts from the step S1500 and invokes the code "PUSH" to add new program state (program counter=next instruction address, virtual address register=virtual address of current program state) to the program state buffer 322.

The process of FIG. 6 then sets the visit flag to the corresponding program counter in the visit table 324. The process of the step S611 has passed the control thereof upon completion of the sub-processes (b), (c), (d) and (e) together with the sub-process (f) and then the instructions present in the program counter may be identified when the abstract interpreter 322 has examined past. The process then returns to the step S602 which determination whether or not the program states being not subjected to the abstract interpretation are present. If the program state is not present in the program state buffer 322 (yes), the process of FIG. 6 is terminated and CFG has been generated at the end of the main process of FIG. 6.

As described above, already-interpreted instructions in the program counter is identified by the visit indicator 323 to avoid multiple abstract interpretations on the same instruction. These features significantly reduce computing time and/or hardware consumptions required to the abstract interpretation of the program and make it possible to provide the scalability for generating CFG.

FIG. 16 shows an experimental examination of the present embodiment for improving computing performances of CFG. A computing system used was System Z implemented with Z/Architecture and the example program was written by C++. The sample programs were those written by the language COBOL and a conventional compiler for COBOL was used to generate un-optimized binary object codes. As for a comparative example, a conventional method for the abstract interpretation was adapted to the abstract interpretation of the COBOL was used.

FIG. 16 (*a*) shows the results of the experimental examinations. For the computation times and memory consumptions, the conventional method failed completions of the abstract interpretations due out-of-memory error in spite of consumption of CPU time of 712 sec for the COBOL binary sample of 233 KB and 3198 sec for the COBOL binary sample of 41 KB.

With respect to the present embodiment, the abstract interpretations and generation of CFG were completed within acceptable CPU times (0.027 sec and 0.004 sec) and memory consumptions (5.1 MB and 744 KB) about the same binary samples. The experimental results significantly show improvement of the abstract interpretation for CFG generation.

FIG. 16 (*b*) shows accuracies of the generated CFG edges between the conventional method and the present embodiment. The COBOL binaries were selected from smaller seizes than the experimental of FIG. 16(*a*). As shown in FIG. 16 (*b*), the number of CFG edges for two methods did not show large discrepancies and hence, it is considered that the accuracy of the present embodiment may be kept within allowable level.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer executable method for analyzing a control flow graph by an abstract interpretation of a program comprising:
   extracting a program state of the program from a program state buffer, the program state including a program counter;
   generating an edge of a control flow graph from a branch instruction associated with the program counter to a target address of the branch instruction in an abstract interpretation for an assignment instruction to a branch target variable of a program;
   the program allocating a particular branch target variable to each branch instruction having a plurality of branch targets configured to store branch target addresses of each of the plurality of branch targets, with a branch target address for one of the plurality of branch targets being loaded from the branch target variable upon branching;
   a branch address of a branch instruction having one branch target as well as the target address assigned by the assignment instruction to the branch target variable being determined as certain constant values determined by compiling the program;

adding the target address assigned by the assignment instruction to a program counter of a new program state of the abstract interpretation, and setting a visit indicator for the particular program counter associated with the branch instruction; and terminating a current abstract interpretation in the case that the abstract interpretation reaches to program state already subjected to the abstract interpretation, as indicated by a visit indicator set for a program state.

2. The computer executable method of claim 1, further comprising adding an address of an instruction following to the currently interpreted branch instruction as an object of the abstract interpretation where the branch instruction having the plurality of branch targets is subjected to the abstract interpretation.

3. The computer executable method of claim 1, further comprising:

copying an address of the program counter and a virtual address for performing the abstract interpretation to a memory; and deleting the copied program counter and the copied virtual address from the memory in a first-in-last-out scheme by completion of the abstract interpretation of the corresponding instruction.

4. The computer executable method of claim 1, further comprises:

setting the visit indicator to the instructions after the abstract interpretation of each of the instruction is finished;

examining if an instruction to be subjected to the abstract interpretation next is already subjected to the abstract interpretation by referring to the visit indicator; and where the instruction to be subjected to the abstract interpretation next is already interpreted, omitting further abstract interpretations for a next instruction and trying to retrieve another instruction being not yet subjected to the abstract interpretation.

5. The computer executable method of claim 2, further comprises:

loading a virtual address of a target top address of the branch instruction to a virtual address register;

computing a virtual address of the branch target by adding an immediate operand of the assignment instruction to the virtual address of the target top address of the branch instruction; and defining the edge of the control flow graph between the branch instruction to the branch target.

6. The computer executable method of claim 5, further comprising:

providing the branch target variable for storing the virtual address of the branch target.

7. A computer system for analyzing a control flow graph by an abstract interpretation of a program, the computer system comprising a non-transitory storage memory and a processor for executing a computer program tangibly loaded in the memory, the computer program comprising the program codes of:

extracting a program state of the program from a program state buffer, the program state including a program counter;

generating an edge of a control flow graph from a branch instruction associated with the program counter to a target address of the branch instruction in an abstract interpretation for an assignment instruction to a branch target variable of a program;

the program allocating a particular branch target variable to each branch instruction having a plurality of branch targets configured to store branch target addresses of each of the plurality of branch targets, with a branch target address for one of the plurality of branch targets being loaded from the branch target variable upon branching;

a branch address of a branch instruction having one branch target as well as the target address assigned by the assignment instruction to the branch target variable being determined as certain constant values determined by compiling the program;

adding the target address assigned by the assignment instruction to a program counter of a new program state of the abstract interpretation, and setting a flag for the particular program counter associated with the branch instruction; and terminating a current abstract interpretation in the case that the abstract interpretation reaches to program state already subjected to the abstract interpretation, as indicated by a flag set for a program state.

8. The computer system of claim 7, further comprising the program codes of:

adding an address of an instruction following to the currently interpreted branch instruction as an object of the abstract interpretation where the branch instruction having the plurality of branch targets is subjected to the abstract interpretation.

9. The computer system of claim 7, further comprising the program codes of:

copying an address of the program counter and a virtual address for performing the abstract interpretation to a memory; and deleting the copied program counter and the copied virtual address from the memory in a first-in-last-out scheme by completion of the abstract interpretation of the corresponding instruction.

10. The computer system of claim 7, further comprising the program codes of:

setting the visit indicator to the instructions after the abstract interpretation of each of the instruction is finished;

examining if an instruction to be subjected to the abstract interpretation next is already subjected to the abstract interpretation by referring to the visit indicator; and where the instruction to be subjected to the abstract interpretation next is already interpreted, omitting further abstract interpretations for a next instruction and trying to retrieve another instruction being not yet subjected to the abstract interpretation.

11. The computer system of claim 7, further comprising:

loading a virtual address of a target top address of the branch instruction to a virtual address register;

computing a virtual address of the branch target by adding an immediate operand of the assignment instruction to the virtual address of the target top address of the branch instruction; and defining the edge of the control flow graph between the branch instruction to the branch target.

12. The computer system of claim 11, further comprising the program codes of:

providing the branch target variable for storing the virtual address of the branch target.

13. The computer system of claim 7, wherein the computer system comprises a module of a binary optimizer for analyzing the control flow graph.

14. A control flow graph analyzer for analyzing a control flow graph to optimize binary object codes of a program in COBOL, the control flow graph analyzer comprising a non-transitory computer readable media and the program codes of:

extracting a program state of the program from a program state buffer, the program state including a program counter;

using a processor in generating an edge of a control flow graph from a branch instruction to a target address of the branch instruction in an abstract interpretation for an assignment instruction to a branch target variable of a program;

the program allocating a particular branch target variable to each branch instruction associated with the program counter having a plurality of branch targets configured to store branch target addresses of each of the plurality of branch targets, with a branch target address for one of the plurality of branch targets being loaded from the branch target variable upon branching;

a branch address of a branch instruction having one branch target as well as the target address assigned by the assignment instruction to the branch target variable being determined as certain constant values determined by compiling the program;

adding the target address assigned by the assignment instruction to a program counter of a new program state of the abstract interpretation, and setting a flag for the particular program counter associated with the branch instruction; and terminating a current abstract interpretation in the case that the abstract interpretation reaches to an program state already subjected to the abstract interpretation, as indicated by a flag set for a program state.

15. A program product for making a computer system execute an analysis of a control flow graph, the program product comprising a non-transitory computer readable media including a memory of the computer system, and having, recorded therein, a program for analyzing the control flow graph, the program comprising the program codes of:

extracting a program state of the program from a program state buffer, the program state including a program counter;

generating an edge of a control flow graph from a branch instruction associated with the program counter to a target address of the branch instruction in an abstract interpretation for an assignment instruction to a branch target variable of a program;

the program allocating a particular branch target variable to each branch instruction having a plurality of branch targets configured to store branch target addresses of each of the plurality of branch targets, with a branch target address for one of the plurality of branch targets being loaded from the branch target variable upon branching;

a branch address of a branch instruction having one branch target as well as the target address assigned by the assignment instruction to the branch target variable being determined as certain constant values determined by compiling the program;

adding the target address assigned by the assignment instruction to a program counter of a new program state of the abstract interpretation, and setting a flag for the particular program counter associated with the branch instruction; and terminating a current abstract interpretation in the case that the abstract interpretation reaches to program state already subjected to the abstract interpretation, as indicated by a flag set for a program state.

16. The program product of claim 15, further comprising the program codes of:

adding an address of an instruction following to the currently interpreted branch instruction as an object of the abstract interpretation where the branch instruction having the plurality of branch targets is subjected to the abstract interpretation.

17. The program product of claim 15, further comprising the program codes of:

copying an address of the program counter and a virtual address for performing the abstract interpretation to a memory; and deleting the copied program counter and the copied virtual address from the memory in a first-in-last-out scheme by completion of the abstract interpretation of the corresponding instruction.

18. The program product of claim 15, further comprising the program codes of:

setting the visit indicator to the instructions after the abstract interpretation of each of the instruction is finished;

examining if an instruction to be subjected to the abstract interpretation next is already subjected to the abstract interpretation by referring to the visit indicator; and where the instruction to be subjected to the abstract interpretation next is already interpreted, omitting further abstract interpretations for a next instruction and trying to retrieve another instruction being not yet subjected to the abstract interpretation.

19. The program product of claim 15, further comprising:

loading a virtual address of a target top address of the branch instruction to a virtual address register;

computing a virtual address of the branch target by adding an immediate operand of the assignment instruction to the virtual address of the target top address of the branch instruction; and defining the edge of the control flow graph between the branch instruction to the branch target.

20. The program product of claim 19, further comprising the program codes of:

providing the branch target variable for storing the virtual address of the branch target.

\* \* \* \* \*